Sept. 26, 1944. W. C. TRAUTMAN 2,358,949
LIQUID PRESSURE SYSTEM
Filed April 17, 1941
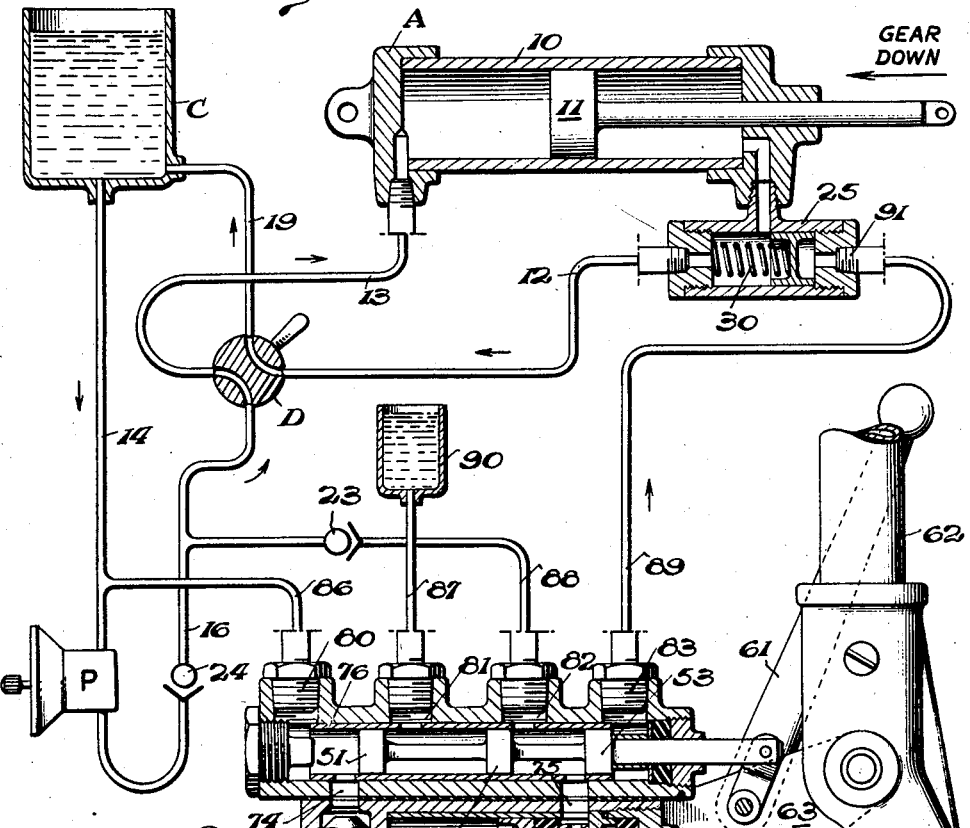
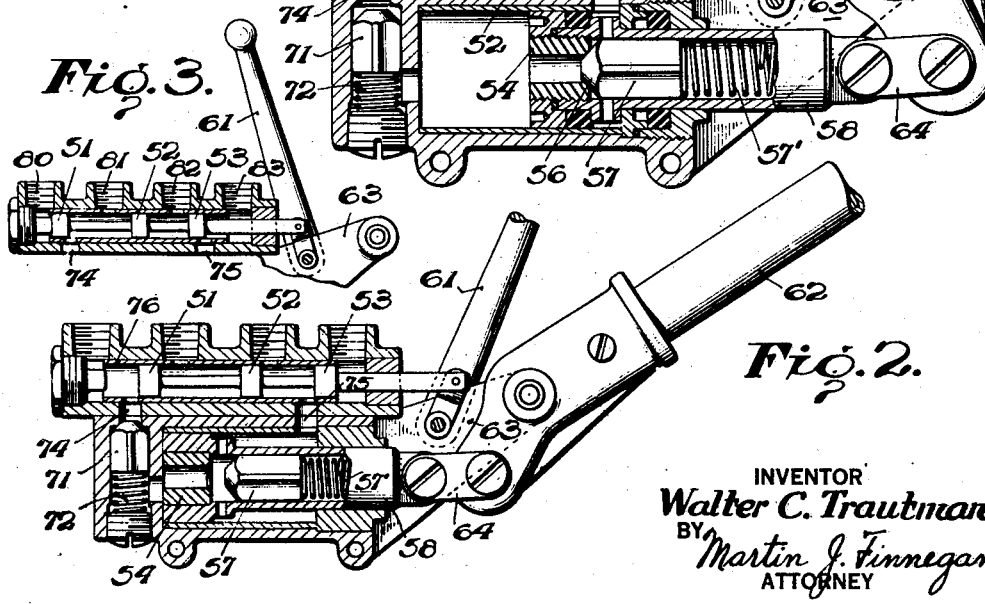
INVENTOR
Walter C. Trautman.
BY Martin J. Finnegan.
ATTORNEY Patented Sept. 26, 1944

2,358,949

UNITED STATES PATENT OFFICE 2,358,949

LIQUID PRESSURE SYSTEM

Walter C. Trautman, Los Angeles, Calif., assignor, by mesne assignments, to Bendix Aviation Corporation, South Bend, Ind., a corporation of Delaware Application April 17, 1941, Serial No. 389,052

4 Claims. (Cl. 60—52)

This invention relates to liquid pressure remote control systems, and particularly to installations where it is desirable that a choice of pipe lines should be available, such, for example, as on military aircraft where there is always a danger of one or more of the component parts of the system becoming inoperative.

As pointed out in Patent No. 2,186,235, issued to F. V. Brown on January 9, 1940, the pipe lines of a remote control system are perhaps most liable to this danger as they extend usually for long distances, and are rendered inoperative by a rupture at any point in their length.

Regarded broadly, therefore, an object of the invention is to provide in a liquid pressure remote control system comprising a main power-driven pressure producing pump and a fluid motor connected together by one or more pipe lines, an auxiliary pipe line which from a position adjacent the main pump can be brought into operation in place of the pipe line or one of the pipe lines normally used, the line thus replaced being isolated from the auxiliary pipe line. The invention further provides an arrangement in which a second auxiliary pipe line connects one side of the motor with an auxiliary source of liquid pressure whereby the motor can be actuated in one particular direction in the event of destruction of both of the normal pipe lines as well as the normal source of liquid. The invention is consequently useful in conjunction with aircraft retractable landing gear, the lowering of which is effected in whole or in part by liquid pressure.

A further object of the invention is to provide a liquid pressure remote control system incorporating an auxiliary pipe line to be brought into use in the case of destruction of the normal source of liquid, which auxiliary pipe line extends from a hand pump having connection with an emergency source of liquid and feeds a motor through an automatic valve arranged to prevent the pressure liquid fed through the auxiliary pipe line from escaping through the normal pipe line serving to actuate the motor in the same direction as does the liquid fed through the auxiliary pipe line.

Another object is to provide, in conjunction with such a hand pump and emergency reservoir, a selector valve having selective communication with either said emergency reservoir or the normal reservoir which supplies the main pump, according to the setting of the selector valve, which is shiftable at will.

Another object of the invention is to combine a hand pump and selector valve in a single unit having fluid passages common to both the valve and pump, and also having mounting means common to both control handles, wherefore there is effected a saving not only in dimensions and weight of the system, but also in the number of exposed fluid conduits, thereby minimizing the rupture hazard.

These and other features of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing,

Fig. 1 is a diagram of a system embodying the invention, and including sectional views of the component parts; and Figs. 2 and 3 show certain of the parts of Fig. 1 in other positions.

In the system shown a double-acting motor A, comprising a cylinder 10 containing a slidably mounted piston 11, is fed normally through a pair of pipe lines 12 and 13, either one of which is supplied with liquid under pressure by means of a mechanically driven pump P which is fed with liquid from a reservoir C through a pipe 14. For determining the direction in which the motor A is actuated during normal use, a reversing valve, which may be of any convenient construction, is indicated at D, in Figure 1, and is arranged so that the delivery from the mechanically driven pump P passing through a pipe 16 can be directed either to the pipe line 13 for raising the piston 11, or to the pipe line 12 for lowering said piston. It will be seen that whichever way the piston 11 is actuated, the liquid rejected from the cylinder 10 passes through a pipe 19 and is returned to the reservoir C.

The combined hand pump and selector valve assembly includes a pair of parallel bores in a common housing, the smaller bore receiving a spool-type valve element having lands 51, 52, and 53, and the larger bore receiving the pump piston which, as shown, is an assembly of parts including a central hollow element 54 upon which conical head 56 of valve 57 is periodically seated by the action of spring 57' located in the bore of piston rod 58. Both the valve handle 61 and the pump handle 62 are pivotally mounted on bracket 63 of the housing assembly, and a link 64 serves to transmit the motion of handle 62 to the piston rod 58. The housing has a third bore in which is received a valve 71 whose conical head is urged by a spring 72 toward a seat at the lower end of passage 74. The valve liner 76 has apertures registering with passages 74 and 75 of the pump housing, also with pipe fittings 80, 81, 82, and 83 which receive conduits 86, 87, 88, and 89, respectively. A non-return valve 23 in the pipe 88 and a similar fitting 24 in the pipe 16 prevent the liquid from the pump P entering the pump 54, and vice versa.

In the installation shown in Figure 1 it is assumed that the piston 11 is used for controlling the movements of an aircraft undercarriage, and that the downward movement of said piston brings about or at least assists the lowering of the undercarriage. It will be evident, therefore, that if the undercarriage is raised and the pump P becomes inoperative, difficulty might normally be experienced in releasing the undercarriage for landing purposes. This difficulty can be overcome in accordance with the present invention by resort to either one of two alternative methods of supplying liquid under pressure to the motor A. The first alternative method is to leave the pump selector valve handle in the normal position as shown in Figs. 1 and 2, and operate the hand pump to draw fluid from the normal reservoir C, and pump it into line 88, through the check valve 23, and into the normal hydraulic system. In this manner the pump acts to supply the main circuit independently of the pump P.

In the event that either or both the normal reservoir C and a number of hydraulic lines have been ruptured or broken away, due to gun fire, or other causes, this would render ports 80 and 82 of the selector valve useless, since port 80 would receive no supply of oil and port 82 would feed into broken lines. In such an emergency— that is, with the power driven hydraulic pump inoperative, the normal fluid reservoir C torn open, and one or more of the main system hydraulic lines 16, 12, and 13 shot away—it is still possible by shifting the pump selector valve handle to the emergency position (Fig. 3) to pump from the small emergency reservoir 90 into the "down" side of the landing gear motor A, by way of line 89 and valve 25. This provides the pilot with a third means to effect a safe landing by getting his landing gear down.

In this emergency position of the selector valve, the path of flow is by way of port 81 to port 74, thence past valves 71 and 56 of the pump and out to line 89 by way of ports 75 and 83. The pressure thus created in line 89 will shift automatic shuttle valve 25 to the left (compressing spring 30) and allow entry of the fluid to the right-hand chamber of motor A, to lower the landing gear.

I do not claim novelty for the automatic shuttle valve 25, per se, in view of Patent No. 2,186,235, above referred to; but the system in which I employ this valve is novel in the respects pointed out herein, and defined in the appended claims, and this is true also of the mechanical construction of the hand-pump and selector valve assembly, and the mode of operation thereof. As to the mode of operation, it will be seen that during movement of the piston rod 58 to the right, the valve 57 will be seated and therefore the fluid to the right of the piston will be pumped to the delivery line by way of port 75 and the selector valve. Also during this movement of the piston to the right, the absence of fluid to the left of the piston will create a vacuum sufficient to reduce the pressure on the underside of valve 71 to a point which is less than the pressure of the fluid flowing in from the reservoir, and in consequence of this pressure differential the valve 71 opens to permit influx of fluid to refill the pump chamber to the left of the piston, as the latter progresses toward the right-hand limit of its stroke. As the piston reverses, valve 57 opens under the pressure of the fluid to its left, and this fluid thereupon flows into the pump chamber to the right of the piston, from which location it will be pumped to the delivery line on the next cycle of operation of the pump. During the leftward travel of the piston the valve 71 is closed by the combined action of the fluid beneath the valve and the valve closing spring 72.

The valves 57 and 71 are of molded, plastic material, and their frusto-conical ends are molded to produce an angular relationship slightly less than ninety degrees, so that when they engage their respective tapered seats (whose taper presents a true ninety degree included angle) they can be wedged more firmly thereagainst; the plastic constituency of the valve noses being sufficiently deformable to offset any angular differences, and therefore produce perfect seating.

What is claimed is:

1. A fluid pressure remote control system comprising, in combination, a double-acting fluid pressure responsive motor, a normal source of fluid pressure including a reservoir and power-driven pump for supplying operating fluid to said motor, an emergency reservoir, an emergency source of operating fluid for said motor, said emergency source including a hand pump and a selector valve built into a common housing and means dependent upon the position of said selector valve for causing said hand pump to deliver fluid to said motor from either said first-named reservoir or said emergency reservoir.

2. A fluid pressure remote control system comprising, in combination, a double-acting fluid pressure responsive motor, a normal source of fluid pressure including a reservoir and power-driven pump for supplying operating fluid to said motor, an emergency reservoir, an emergency source of operating fluid for said motor, said emergency source including a hand pump and a selector valve built into a common housing and connected to said first named reservoir and said emergency reservoir, and means dependent upon the position of said selector valve for causing said hand pump to deliver fluid to only one chamber of said motor, or to both chambers alternately.

3. A fluid pressure remote control system comprising, in combination, a double-acting fluid pressure-responsive motor, a normal source of fluid pressure including a first reservoir and power-driven pump for supplying operating fluid to said motor, a hand pump and a selector valve built into a common housing and having connections therebetween for communicating fluid from said selector valve to said hand pump and vice versa, a second reservoir for providing a second source of operating fluid for said motor and connected to said selector valve, a connection from said first reservoir to said selector valve, connections from said selector valve to said double-acting fluid pressure-responsive motor, said selector valve having a normal position for communicating said first reservoir with said hand pump for supplying fluid under pressure to said motor for moving the same in either direction in response to operation of said hand pump, and said valve having an emergency position for communicating said second reservoir with said hand pump for supplying fluid under pressure to said motor for moving the same in response to operation of said hand pump at a time when said first reservoir is unable to supply fluid for said system.

4. A fluid pressure remote control system comprising, in combination, a double-acting fluid pressure-responsive motor, a hand pump and a selector valve constituted in a common housing and having passages therebetween for communicating fluid from said selector valve to said hand pump and vice versa, a first reservoir connected to said selector valve, a power pump for delivering liquid from said first reservoir to either side of said fluid motor, a second reservoir connected to said selector valve, and a pair of conduits leading from said selector valve to one side of said motor through an interposed shuttle valve, said selector valve in one position connecting said first reservoir to the hand pump inlet and the hand pump outlet to one of said conduits, and in another position connecting said second reservoir to the hand pump inlet and the hand pump outlet to the other of said conduits.

WALTER C. TRAUTMAN.